United States Patent
Levy

(10) Patent No.: US 9,782,706 B1
(45) Date of Patent: Oct. 10, 2017

(54) FLOW CONNECTOR FOR CONNECTING SCREW-TYPE FILTRATION HEAD TO LUG-TYPE SUMP

(75) Inventor: Ehud Levy, Roswell, GA (US)

(73) Assignee: SELECTO, INC., Suwanee, GA (US)

( * ) Notice: Subject to any disclaimer, the term of this patent is extended or adjusted under 35 U.S.C. 154(b) by 1487 days.

(21) Appl. No.: 12/081,502

(22) Filed: Apr. 16, 2008

(51) Int. Cl.
*B01D 35/02* (2006.01)
*B01D 35/30* (2006.01)

(52) U.S. Cl.
CPC ........... *B01D 35/02* (2013.01); *B01D 35/306* (2013.01); *B01D 2201/291* (2013.01); *B01D 2201/302* (2013.01)

(58) Field of Classification Search
CPC ............................ B01D 35/306; B01D 35/02; B01D 2201/302; B01D 2201/291
USPC ......................................................... 210/443
See application file for complete search history.

(56) References Cited

U.S. PATENT DOCUMENTS

| | | |
|---|---|---|
| 1,020,212 A | 3/1912 | Lukowski |
| 2,107,165 A | 2/1938 | Rice |
| 2,158,347 A | 5/1939 | Yirava |
| 2,240,648 A | 5/1941 | Hartman |
| 2,338,291 A | 1/1944 | McIntosh |
| 2,563,548 A | 8/1951 | Plante |
| 3,333,697 A | 8/1967 | Rossen |
| 3,347,386 A | 10/1967 | Kraissi, Jr. |
| 3,358,839 A | 12/1967 | Simons |
| 3,399,776 A | 9/1968 | Knuth |
| 3,447,558 A | 6/1969 | Cserny |
| 3,529,515 A | 9/1970 | Lang |
| 3,540,594 A | 11/1970 | Sanderson |
| 3,684,100 A | 8/1972 | Close |
| 3,746,171 A | 7/1973 | Thomsen |
| 3,760,951 A * | 9/1973 | Mansfield ..................... 210/449 |
| 3,780,867 A | 12/1973 | Zirlis |
| 3,802,564 A | 4/1974 | Turman |
| 3,852,196 A | 12/1974 | Szpur |
| 3,859,216 A | 1/1975 | Sisson et al. |
| 3,882,024 A * | 5/1975 | Holmes et al. ............ 210/321.8 |
| 3,914,176 A | 10/1975 | Holmes |
| 3,923,663 A | 12/1975 | Reid |
| 3,950,251 A | 4/1976 | Hiller |
| 3,954,624 A | 5/1976 | Petrucci |
| 4,006,752 A | 2/1977 | De Vale |
| 4,051,036 A | 9/1977 | Conrad et al. |
| 4,052,307 A | 10/1977 | Hubmbert, Jr. |
| 4,082,673 A | 4/1978 | Cilento |
| 4,105,561 A | 8/1978 | Domnick |
| 4,268,384 A | 5/1981 | Rosaen et al. |
| 4,304,736 A | 12/1981 | McMillin et al. |
| 4,335,688 A | 6/1982 | Diederich |
| 4,349,438 A | 9/1982 | Sims |

(Continued)

FOREIGN PATENT DOCUMENTS

| | | |
|---|---|---|
| EP | 0315810 A1 | 5/1989 |
| EP | 0781952 A1 | 7/1997 |

(Continued)

*Primary Examiner* — Bobby Ramdhanie
*Assistant Examiner* — Denise R Anderson
(74) *Attorney, Agent, or Firm* — Dickinson Wright PLLC

(57) ABSTRACT

A flow connector adapted to connect a lug-type filtration sump to a screw-type filtration head, having a first portion for receiving a lug-type filtration sump, and a second portion receivable by a screw-type filtration head.

11 Claims, 5 Drawing Sheets

(56) References Cited

U.S. PATENT DOCUMENTS

| | | |
|---|---|---|
| 4,396,512 A | 8/1983 | Beauman et al. |
| 4,419,234 A | 12/1983 | Miller et al. |
| 4,433,617 A | 2/1984 | Magnusson |
| 4,437,499 A | 3/1984 | DeVale |
| 4,440,200 A | 4/1984 | DeVale et al. |
| 4,465,595 A | 8/1984 | Cooper |
| 4,495,072 A | 1/1985 | Fields |
| 4,497,348 A | 2/1985 | Sedam |
| 4,520,950 A | 6/1985 | Jeans |
| 4,529,050 A | 7/1985 | Mosher et al. |
| 4,529,514 A | 7/1985 | Gruett |
| 4,540,489 A | 9/1985 | Barnard |
| 4,548,227 A | 10/1985 | Regunathan et al. |
| 4,556,484 A | 12/1985 | Hunter et al. |
| 4,559,136 A | 12/1985 | Dockery |
| 4,594,361 A | 6/1986 | Beauman et al. |
| 4,604,109 A | 8/1986 | Koslow |
| 4,615,812 A | 10/1986 | Darling |
| 4,637,874 A | 1/1987 | Ansteth |
| 4,645,601 A | 2/1987 | Regunathan et al. |
| 4,654,142 A | 3/1987 | Thomsen et al. |
| 4,683,057 A | 7/1987 | Krause et al. |
| 4,698,164 A | 10/1987 | Ellis |
| 4,725,354 A | 2/1988 | Thomsen et al. |
| 4,753,728 A | 6/1988 | VanderBilt et al. |
| 4,759,474 A | 7/1988 | Regunathan et al. |
| 4,770,770 A | 9/1988 | Regunathan et al. |
| 4,786,420 A | 11/1988 | Dalessandro |
| 4,806,240 A | 2/1989 | Giordano et al. |
| 4,828,698 A | 5/1989 | Jewell et al. |
| 4,857,189 A | 8/1989 | Thomsen et al. |
| 4,859,386 A | 8/1989 | VanderBilt et al. |
| 4,865,738 A | 9/1989 | Black, Jr. et al. |
| 4,877,521 A | 10/1989 | Petrucci et al. |
| 4,882,061 A | 11/1989 | Petrucci et al. |
| 4,904,382 A | 2/1990 | Thomsen |
| 4,915,831 A | 4/1990 | Taylor |
| 4,933,080 A | 6/1990 | Rundzaitis et al. |
| 4,948,505 A | 8/1990 | Petrucci et al. |
| 4,956,086 A | 9/1990 | Thomsen et al. |
| 4,966,692 A | 10/1990 | Overy |
| 5,000,143 A | 3/1991 | Brown |
| 5,017,318 A | 5/1991 | VanderBilt et al. |
| 5,019,311 A | 5/1991 | Koslow |
| 5,022,986 A | 6/1991 | Lang |
| 5,032,116 A * | 7/1991 | Peterson et al. ......... 604/168.01 |
| 5,049,269 A | 9/1991 | Shah |
| 5,126,044 A | 6/1992 | Magnusson et al. |
| 5,129,291 A | 7/1992 | Poniatowski |
| RE34,031 E | 8/1992 | Thomsen et al. |
| 5,135,645 A | 8/1992 | Sklenak et al. |
| RE34,050 E | 9/1992 | Thomsen et al. |
| 5,145,033 A | 9/1992 | Bedi et al. |
| 5,147,722 A | 9/1992 | Koslow |
| 5,164,085 A | 11/1992 | Spokoiny et al. |
| 5,189,092 A | 2/1993 | Koslow |
| 5,215,655 A | 6/1993 | Mittermaier |
| 5,249,948 A | 10/1993 | Koslow |
| 5,256,285 A | 10/1993 | Tomita et al. |
| 5,269,919 A | 12/1993 | von Medlin |
| 5,273,649 A | 12/1993 | Magnusson et al. |
| 5,291,863 A | 3/1994 | Jones |
| 5,328,609 A | 7/1994 | Magnusson et al. |
| 5,331,037 A | 7/1994 | Koslow |
| 5,336,406 A | 8/1994 | Stanford et al. |
| 5,354,464 A | 10/1994 | Slovak et al. |
| D356,625 S | 3/1995 | Petrucci et al. |
| 5,397,462 A | 3/1995 | Higashijima et al. |
| 5,474,451 A | 12/1995 | Dairymple et al. |
| 5,486,288 A | 1/1996 | Stanford et al. |
| 5,527,470 A | 6/1996 | Suda |
| 5,538,647 A | 7/1996 | Koslow |
| 5,548,227 A | 8/1996 | Minami |
| 5,548,893 A | 8/1996 | Koelfgen |
| 5,562,824 A | 10/1996 | Magnusson |
| 5,569,373 A | 10/1996 | Smith et al. |
| D377,437 S | 1/1997 | Magnusson |
| 5,593,578 A | 1/1997 | Bryan et al. |
| D378,883 S | 4/1997 | Magnusson |
| 5,653,871 A | 8/1997 | Thomsen |
| 5,685,981 A | 11/1997 | Koslow |
| 5,693,219 A | 12/1997 | Beauchamp |
| 5,700,371 A | 12/1997 | Koslow |
| 5,705,067 A | 1/1998 | Sumi et al. |
| D391,348 S | 2/1998 | Borgesen |
| 5,743,358 A | 4/1998 | Bedi et al. |
| 5,753,107 A | 5/1998 | Magnusson et al. |
| 5,766,451 A | 6/1998 | Sparling |
| 5,830,371 A | 11/1998 | Smith et al. |
| 5,833,849 A | 11/1998 | Primdahl |
| 5,853,575 A | 12/1998 | Wydra et al. |
| 5,855,242 A * | 1/1999 | Johnson ................. 166/236 |
| 5,914,037 A | 6/1999 | Yen |
| 5,919,362 A | 7/1999 | Barnes et al. |
| 5,922,803 A | 7/1999 | Koslow et al. |
| 5,944,985 A | 8/1999 | Bowman |
| 5,946,342 A | 8/1999 | Koslow |
| 6,004,460 A | 12/1999 | Palmer et al. |
| 6,027,644 A | 2/2000 | Magnusson et al. |
| 6,058,971 A | 5/2000 | Palmer et al. |
| 6,061,384 A | 5/2000 | Koslow |
| 6,085,915 A | 7/2000 | Schwandt et al. |
| 6,089,205 A | 7/2000 | Grigorian et al. |
| 6,103,116 A | 8/2000 | Kowlow et al. |
| 6,106,287 A | 8/2000 | Yates |
| D433,094 S | 10/2000 | Magnusson et al. |
| 6,139,739 A | 10/2000 | Hamlin et al. |
| 6,142,171 A | 11/2000 | Hancock |
| 6,149,037 A | 11/2000 | Berrend |
| 6,193,879 B1 | 2/2001 | Bowman |
| 6,193,884 B1 | 2/2001 | Magnusson et al. |
| 6,221,242 B1 | 4/2001 | Beibel et al. |
| RE37,216 E | 6/2001 | Koslow |
| 6,325,929 B1 | 12/2001 | Bassett |
| 6,360,764 B1 | 3/2002 | Fritze |
| 6,384,369 B1 | 5/2002 | Stenersen et al. |
| 6,395,190 B1 | 5/2002 | Koslow et al. |
| 6,426,001 B1 | 7/2002 | Fritze |
| 6,432,233 B1 | 8/2002 | Hamlin et al. |
| 6,454,941 B1 | 9/2002 | Cutler et al. |
| 6,458,269 B1 | 10/2002 | Bassett et al. |
| 6,517,880 B2 | 2/2003 | Walters, Jr. et al. |
| D472,299 S | 3/2003 | Fritze |
| D472,604 S | 4/2003 | Fritze |
| 6,550,622 B2 | 4/2003 | Kowlow |
| 6,568,539 B1 | 5/2003 | Deibel et al. |
| 6,649,056 B2 | 11/2003 | Fritze |
| 6,830,683 B2 * | 12/2004 | Gundrum et al. ............ 210/232 |
| 7,264,726 B1 | 9/2007 | Levy |
| 2002/0017497 A1 | 2/2002 | Fritze |
| 2002/0036162 A1 | 3/2002 | Magnusson et al. |
| 2002/0038668 A1 | 4/2002 | Fritze |
| 2002/0125188 A1 | 9/2002 | Hacker et al. |
| 2003/0010698 A1 | 1/2003 | Fritze |
| 2003/0019805 A1 | 1/2003 | Fritze |
| 2003/0019819 A1 | 1/2003 | Fritze |
| 2003/0024568 A1 | 2/2003 | Bowman |
| 2003/0024860 A1 | 2/2003 | Fritze |
| 2003/0061690 A1 | 4/2003 | Finley et al. |
| 2003/0098270 A1 | 5/2003 | Thompson |
| 2003/0209478 A1 | 11/2003 | Nurse, Jr. et al. |
| 2005/0023206 A1 * | 2/2005 | Fritze ..................... 210/235 |
| 2005/0045552 A1 | 3/2005 | Tadlock |
| 2005/0161394 A1 | 7/2005 | Fritze et al. |
| 2006/0016769 A1 | 1/2006 | Hacker et al. |
| 2007/0000833 A1 | 1/2007 | Levy et al. |

FOREIGN PATENT DOCUMENTS

| | | |
|---|---|---|
| EP | 0889229 A2 | 1/1999 |
| FR | 2443197 A | 7/1980 |
| WO | WO 2004/059376 A2 | 8/2004 |

(56) References Cited

FOREIGN PATENT DOCUMENTS

| WO | WO 2004/089442 A1 | 10/2004 | |
|----|----|----|----|
| WO | WO 2006/044630 A2 | 4/2006 | |
| WO | WO2007002893 A2 * | 1/2007 | ................ C02F 1/00 |

* cited by examiner

FLOW CONNECTOR FOR CONNECTING SCREW-TYPE FILTRATION HEAD TO LUG-TYPE SUMP

BACKGROUND

1. Field

Disclosed is an flow connector for use in the filtration area, more particularly in the water filtration area, and even more particularly in the area of filtering water supplied to commercial establishments.

2. Description of the Related Art

Certain embodiments of lug-type filtration sumps having planar endcaps are disclosed in U.S. Patent Application Publication No. 2007/0000833, the entire contents of which are incorporated herein by reference. Such sumps provide a number of benefits, including ease of replacement (the sump can be removed by simply twisting the sump slightly relative to the purification head, without the need for wrenches or specialized tools), disposability (the sump can be made entirely of disposable plastic, and does not require an external shell of expensive aluminum or stainless steel), sanitary replacement (the sump is entirely self-contained, so that technicians need not come into contact with the internal filtration media), and improved leak resistance.

However, the use of the lug-type filtration sump described above requires installation of a filtration head assembly that is capable of receiving the sump in a way that provides good liquid flow rates through the device, does not leak, and is dimensionally and vibrationally stable, so that the adverse effects of water-hammer and other pressure variations are reduced or eliminated. Unfortunately, there are a large number of legacy filtration equipment that is not capable of using the disposable lug-type filtration sump, because the filtration head assembly is adapted to receive and retain a sump via a threaded connection, more particularly, because the filtration head assembly connects to the sump via a screw-type connection provided by, e.g., a threaded opening in the filtration head assembly and a corresponding threaded projection on the outside of the sump.

These legacy filtration systems exhibit can be difficult to service, because of stresses imposed on the threads due to pressurization of the system, thermal coefficient of expansion mismatches, and incorrect installation, so that wrenches or other tools are required to separate the sump from the filtration head assembly. Damage to the threads or to O-rings within the sump or filtration head assembly that result from incorrect installation or water hammer effects of pressure variation in the water supply system also occur with some frequency with threaded systems.

Accordingly, there is a need in the art for a way to connect a lug-type sump to a legacy, screw-type filtration head assembly that provides a water tight connection and leak-proof flow paths between the filtration head assembly and the lug-type sump, and which allows the advantages of the lug-type sump to be realized with legacy screw-type filtration head assemblies.

SUMMARY

In one embodiment is disclosed a flow connector adapted to connect a lug-type filtration sump to a screw-type filtration head, comprising:

a first portion for receiving a lug-type filtration sump, comprising:

a generally cylindrical first sidewall defining a first opening of sufficient size to receive an end of a lug-type filtration sump;

an inner surface of said first sidewall having a plurality of circumferentially spaced openings of sufficient size and shape to receive and retain a lug of a lug-type filtration sump;

a first substantially planar portion opposing said first opening, defined by a first surface of a divider plate;

a second portion receivable by a screw-type filtration head, comprising:

a generally cylindrical second sidewall defining a second opening of sufficient diameter to be received by a screw-type filtration head;

an outer surface of said second sidewall comprising a threaded portion;

an inner portion of said second sidewall;

a rim of said second sidewall, comprising a first circumferentially extending groove of a depth and width sufficient to receive a first elastomeric o-ring;

a second substantially planar portion opposing said second opening, defined by a second surface of said divider plate;

a fluid flow conduit extending axially through said divider plate, defining, with the inner surface of the generally cylindrical first sidewall, a first annular space, and defining with the inner surface of the generally cylindrical second sidewall, a second annular space, wherein the fluid flow conduit is adapted to provide fluid communication between a central longitudinal opening of said filtration sump and a first flow conduit in said filtration head, and wherein any fluid in said fluid flow conduit is separated from said first annular space and said second annular space;

one or more openings in said divider plate, providing fluid communication between said first annular space and said second annular space, and adapted to provide fluid communication between a second flow conduit in a screw-type filtration head and a gap between said fluid purification media and a sidewall of said lug-type filtration sump.

In another embodiment is disclosed a filtration system subassembly comprising:

a screw-type filtration head; and a flow connector as recited in claim 1, engaged with said screw-type filtration head by cooperation of said threaded portion of said outer surface of said second sidewall of the flow connector with threads on said screw-type filtration head.

In another embodiment is disclosed a filtration system subassembly comprising:

a lug-type filtration sump; and a flow connector as recited in claim 1, engaged with said lug-type filtration sump by cooperation of said plurality of circumferentially spaced openings in said inner surface of said first sidewall of the flow connector with lugs on said lug-type filtration sump.

In another embodiment is provided a filtration system, comprising a screw-type filtration head;

a lug-type filtration sump; and a flow connector as recited in claim 1, engaged with said screw-type filtration head by cooperation of said threaded portion of said outer surface of said second sidewall of the flow connector with threads on said screw-type filtration head and engaged with said lug-type filtration sump by cooperation of said plurality of circumferentially spaced openings in said inner surface of said first sidewall of the flow connector with lugs on said lug-type filtration sump.

By avoiding the use of a screw-type filtration sump and instead using a lug-type filtration sump, the flow connector described herein avoids problems that can occur with screw-type sumps. For example, when the flow connector described herein is used, the attachment and detachment of the filtration sump does not require that the filtration sump be rotated any significant amount. This makes replacement of the filtration sumps considerably faster and easier, since the threaded connection between the flow connector and the screw-type filtration head does not need to be unscrewed in order to change the filtration sump. Moreover, since the threaded portion of the flow connector and the threaded portion of the screw-type filtration head need only be engaged once, there are fewer opportunities for the threads and/or o-rings to become distorted or damaged.

The use of a lug-type filtration sump with the flow connector described herein also avoids damage that can occur in a screw-type filtration head/screw-type filtration sump system that is due to pressurization of the system and changes in pressure that result in movement of the filtration sump and filtration head relative to each other, causing damage to the threads and o-ring. The use of the flow connector described herein, despite introducing additional connections into the filtration system, thus surprisingly reduces the likelihood of leakage as compared to a screw-type system.

The flow connector described herein also provides a transfer from a non-planar end-cap geometry, typically associated with a screw-type filtration head and a screw-type filtration sump, to a planar geometry associated with the lug-type filtration sump disclosed in U.S. Patent Application Publication No. 2007/0000833, the entire contents of which have been incorporated herein by reference. This planar geometry places the filtration media cartridge closer to the filtration head, and provides for decreased movement and/or stresses on the filtration sump and the filtration media, and associated attachment points, o-rings, etc., during operation, pressure changes, and the like. As a result, a system using this planar end-cap geometry is substantially less likely to leak in operating environments, such as those found in the food-service or other commercial installations, where pressure cycling is common.

The use of a lug-type filtration sump also allows for easy change-out and replacement of the filtration sump, which can be made of completely disposable or recyclable materials. Because of the lug-type connection to the flow connector, the filtration sump can be replaced without the need for special tools, and in a sanitary fashion, reducing or eliminating exposure of the technician to the fluid in the sump, and any pathogens or harmful materials that may be contained therein by virtue of having been removed from the fluid being filtered.

BRIEF DESCRIPTION OF THE DRAWING FIGURES

Figure 1:
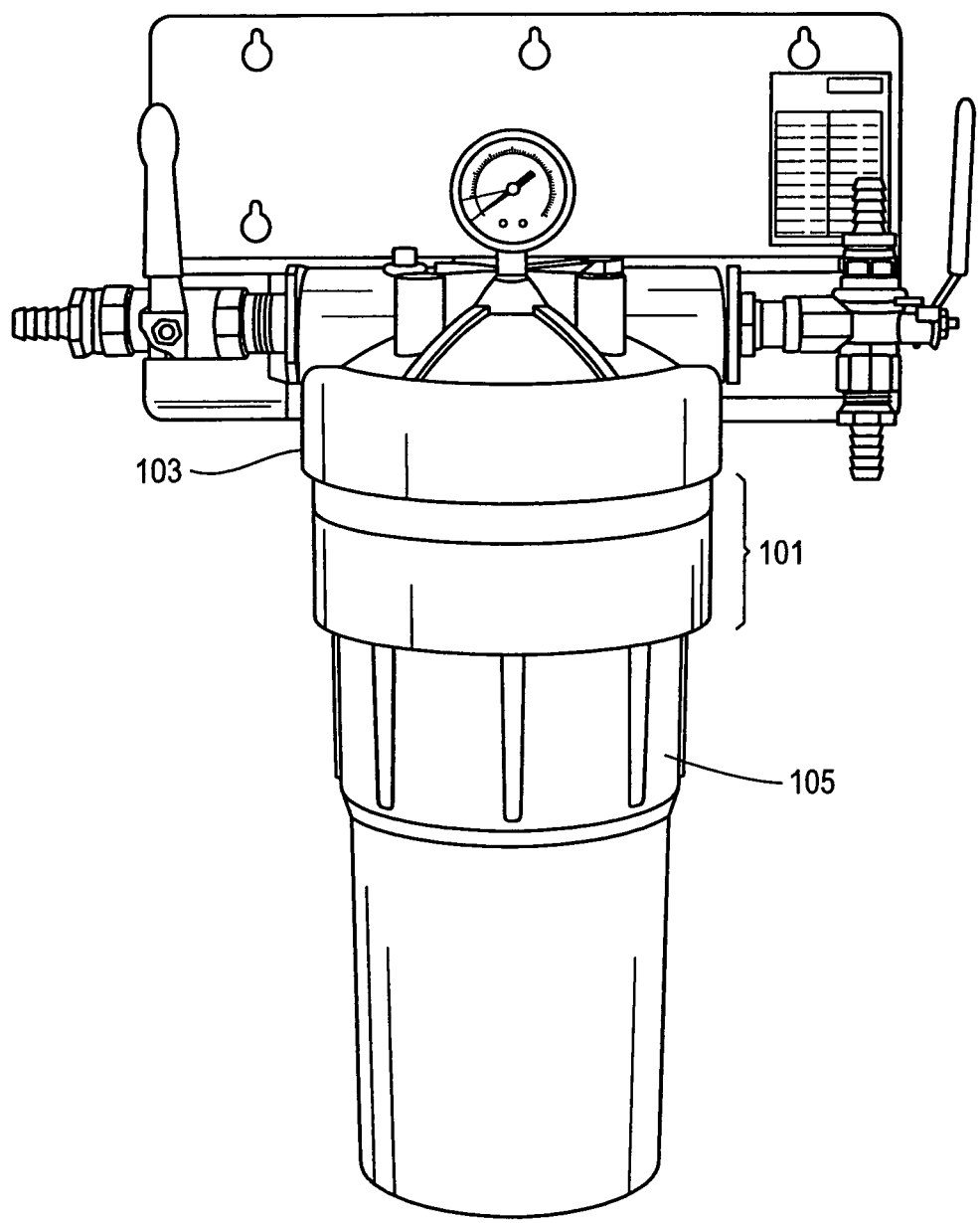
FIG. 1 is a side view of a fluid filtration apparatus having a screw-type fluid filtration head, a lug-type filtration sump, and one embodiment of a flow connector as described herein.

The flow connector described herein can be more clearly understood by reference to the above drawings and the accompanying description. However, neither the drawings nor the description are intended to be limiting of the appended claims or of the scope of the invention described herein.

DETAILED DESCRIPTION OF SPECIFIC EMBODIMENTS

As used herein, the term "adapted to" denotes that the referenced element is particularly suited for performing the recited function, and excludes elements that are not capable of, or are not disclosed to be capable of, performing that same function.

As used herein, the term "about" when used in connection with a numerical amount or range, denotes both the recited value, as well as some deviation from the recited value, the degree of deviation being that expected by one of skill in the relevant art, and can include tolerances, measurement error, and/or other variation, but generally denotes a deviation of less than 10% of the recited value.

As used herein, the term "filtration sump" denotes an element of a fluid filtration or purification system having some form of housing enclosing some form of filtration or purification media, and providing for flow of a fluid, in particular water, from a filtration head into the sump, through the filtration or purification media, and out of the sump to the filtration head.

As used herein, the term "lug-type filtration sump" denotes a filtration sump containing lugs that protrude from the sump, such as lugs that protrude from the filtration sump housing, typically at one end of the filtration sump, and that function, at least in part, to secure or connect the filtration sump to a filtration head assembly, and to allow removal or detachment of the filtration sump from the filtration head assembly, which typically contains grooves or slots that cooperate with the lugs. A nonlimiting example of such a lug-type filtration sump is illustrated in U.S. Patent Application Publication No. 2007/0000833, which has been incorporated by reference above.

As used herein, the term "filtration head" denotes an element of a filtration system which receives incoming fluid, directs this fluid to the unfiltered side of a filtration sump, and receives fluid from the filtered side of a filtration sump, and transfers this filtered fluid from the filtration device. Filtration heads generally also function to keep filtered and unfiltered fluid separate, and may have additional elements that allow them to operate in "by-pass mode," whereby fluid passes directly through the filtration head without being transferred to the filtration sump, and may have pressure release valves, and other features known in the filtration art.

As used herein, the term "screw-type filtration head" denotes a filtration head that contains a threaded portion adapted to cooperate with the threaded portion of a filtration sump. The threaded portions allow the filtration sump to be attached and detached from the screw-type filtration head by rotating the filtration sump (or the filtration head) until the threaded portions are completely engaged or disengaged, respectively.

As used herein, the term "generally cylindrical" denotes a cylindrical geometry (having a radius, a circumference, and a height), as well as geometries that are similar to cylindrical geometries, e.g., where the transverse cross section of the geometry is ovoid, or imperfectly circular, rather than perfectly circular. Such deviations from the strict geometrical definition of "cylindrical" may be unintentional, e.g., the result of imperfections in the manufacture process, or intentional, e.g., the result of a difference in design. In addition, the term is intended to refer to the overall shape of the element of the flow connector, and is intended to include shapes where there may be protrusions, openings, recesses, and other surface features that are not, strictly speaking, part of the surface of a geometrical cylinder.

As used herein, the term "first opening" denotes the generally circular opening circumscribed by the rim of one end of the generally cylindrical first portion of the flow connector.

As used herein, the term "sufficient size to receive an end of a lug-type filtration sump" denotes that the size of the first opening, e.g., the inner dimension (e.g., diameter) of the first portion, is sufficiently large that the outer dimension (e.g., diameter) of the filtration sump housing can be easily inserted into snugly fit in the opening. In addition, there may be slots or grooves, such as longitudinally extending slots or grooves, in the inner surface of the first sidewall that extend to the opening, and that have sufficient width to allow the lugs on the filtration sump to easily be inserted into the opening. These longitudinally extending slots or grooves can be circumferentially spaced, and can communicate with corresponding circumferentially spaced openings of sufficient size and shape to receive and retain the lugs when the lug-type filtration sump is inserted into the first opening and rotated slightly to engage the lugs with the circumferentially spaced openings. This size and shape of the circumferentially spaced openings may retain the lugs by either a friction fit, or by a tongue-and-groove arrangement, or by other means for providing a positive engagement that prevents the filtration sump from disengaging by counter-rotation during operation.

As used herein, the term "substantially planar" denotes a surface that is generally flat, but that may vary from strict geometrical flatness, e.g. due to manufacturing defects or by design, and that may contain surface features, such as recesses, openings, protrusions, and the like, without departing from the meaning of the term.

As used herein, the term "opposing" denotes a position at or near one end of the generally cylindrical sidewall relative to the other end of the generally cylindrical sidewall. For example, the first substantially planar portion of the first portion can be located near an end of the generally cylindrical sidewall that is opposite the end containing the first opening.

As used herein, the term "divider plate" denotes plates that are solid, single plates, as well as plates that are hollow or have internal structure, such as cells, central openings, flow passages, and the like, disposed between two surfaces. These surfaces may result from two or more separate pieces that cooperate to form the structure of a divider plate that separates the first and second portions of the flow connector.

As used herein, the term "sufficient size to be received by a screw-type filtration head" denotes that the size of the second opening, e.g., the outer dimension (e.g., diameter) of the second portion is such that it can fit within the inner dimension (e.g., diameter) of a screw-type filtration head, such that the threaded portions of the second portion of the flow connector and of the screw-type filtration head, are engageable.

As used herein, the term "substantially coaxial" denotes two axes that are the same, or that differ slightly either unintentionally (e.g., due to manufacturing defects) or intentionally (e.g., by design).

For ease of understanding, the flow connector will be described with reference to the attached drawings, wherein the same or similar features are indicated by the same reference number in each drawing.

FIG. 1 illustrates the use of the flow connector 101 described herein in connection with a screw-type filtration head 103 and a lug-type filtration sump 105.

Figure 2:
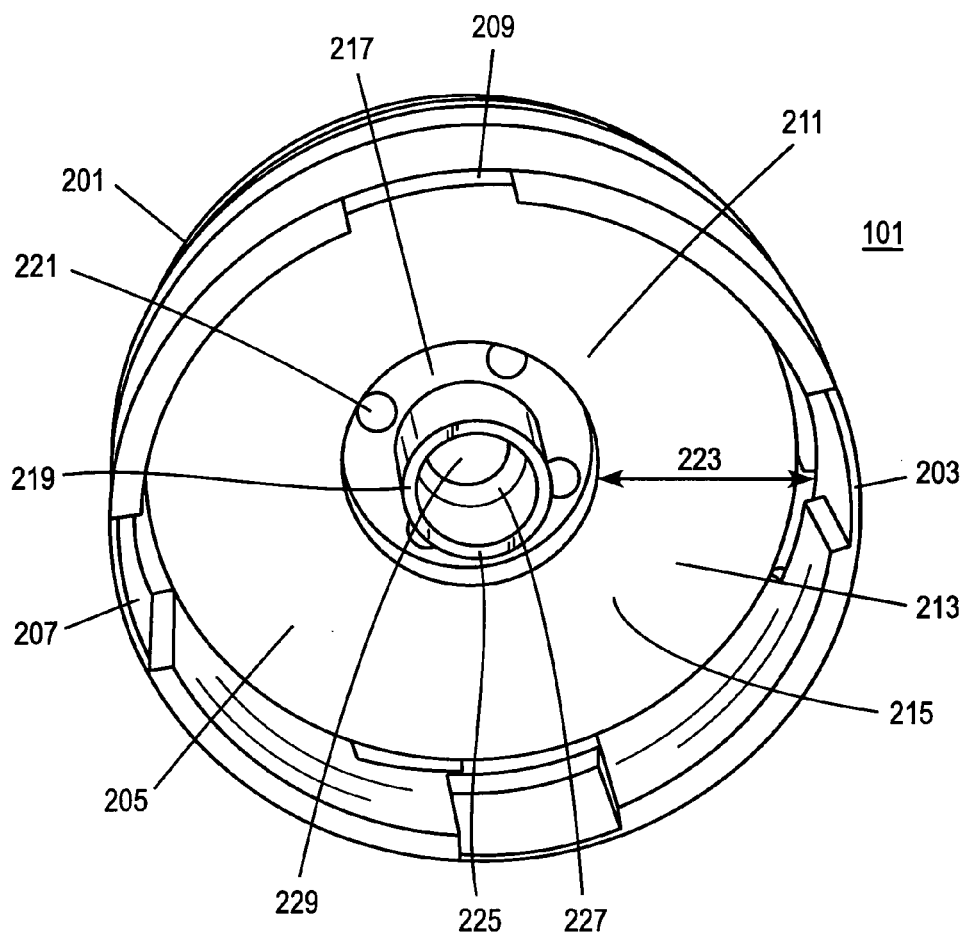
FIG. 2 is a bottom perspective view of one embodiment of a flow connector as described herein.
Figure 3:
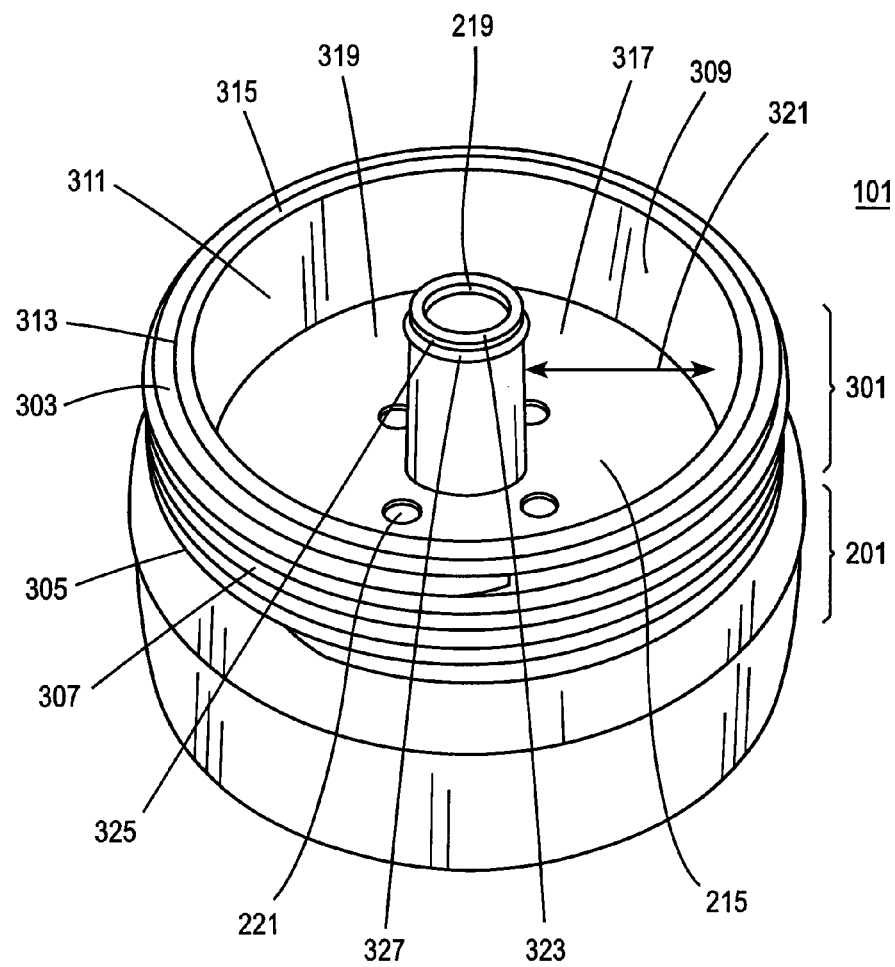
FIG. 3 is a top perspective view of the embodiment of the flow connector illustrated in FIG. 2.

FIG. 2 is a bottom perspective view of an embodiment of the flow connector 101 described herein, showing first portion 201 for receiving a lug-type filtration sump. Generally cylindrical first sidewall 203 defines first opening 205, and contains inner surface 207 having a plurality of circumferentially spaced openings 209 of sufficient size and shape to receive and retain the lugs of lug-type filtration sump 105. The first portion 201 is also defined by first substantially planar portion 211 opposing said opening 205. In the embodiment illustrated, this first substantially planar portion is composed of first surface 213 of divider plate 215, and contains substantially circular recess 217, which is substantially coaxial with fluid flow conduit 219. Substantially circular recess 217 also contains one or more openings 221 in divider plate 215. These openings 221, and fluid flow conduit 219 extend through divider plate 215. The space between the outer surface of fluid flow conduit 219 and inner surface 207 of generally cylindrical first sidewall 203 define first annular space 223. In the embodiment illustrated, fluid flow conduit 219 contains second end 225, which contains a first opening 227 and a second opening 229 that is recessed from first opening 227 and of smaller diameter than first opening 227. In the embodiment illustrated, fluid flow conduit 219 is substantially coaxial with said generally cylindrical first sidewall 203. The diameter of the generally cylindrical first sidewall can vary significantly, but is typically in the range of about 3.5 to about 6 inches, more particularly between about 4 and about 5 inches FIG. 3 is a top perspective view of the embodiment of flow connector 101 shown in FIG. 2. Second portion 301 is receivable by screw-type filtration head 103, and has a generally cylindrical second sidewall 303 having an outer surface 305 having a threaded portion 307. The inner surface 309 of generally cylindrical second sidewall 303 defines a second opening 311, which is of sufficient size that the generally cylindrical second sidewall 303 can fit inside a corresponding opening in screw-type filtration head 103. Rim 313 of generally cylindrical second sidewall 303 can contain a circumferentially extending groove, which in the illustrated embodiment contains an elastomeric o-ring 315. Second portion 301 is also defined by second substantially planar portion 317 opposing second opening 311, and defined by second surface 319 of divider plate 215, which also contains openings 221. The outer surface of fluid flow conduit 219 and inner surface 309 of generally cylindrical second sidewall 303 define second annular space 321. Second annular space 321 is in fluid communication with first annular space 223 by virtue of openings 221. However, both first annular space 223 and second annular space 321 are isolated from the interior of fluid flow conduit 219. First end 323 of fluid flow conduit 219 can, as in the illustrated embodiment, contain one or more circumferential grooves 325 of sufficient depth and width to receive second elastomeric o-ring 327.

Figure 4:
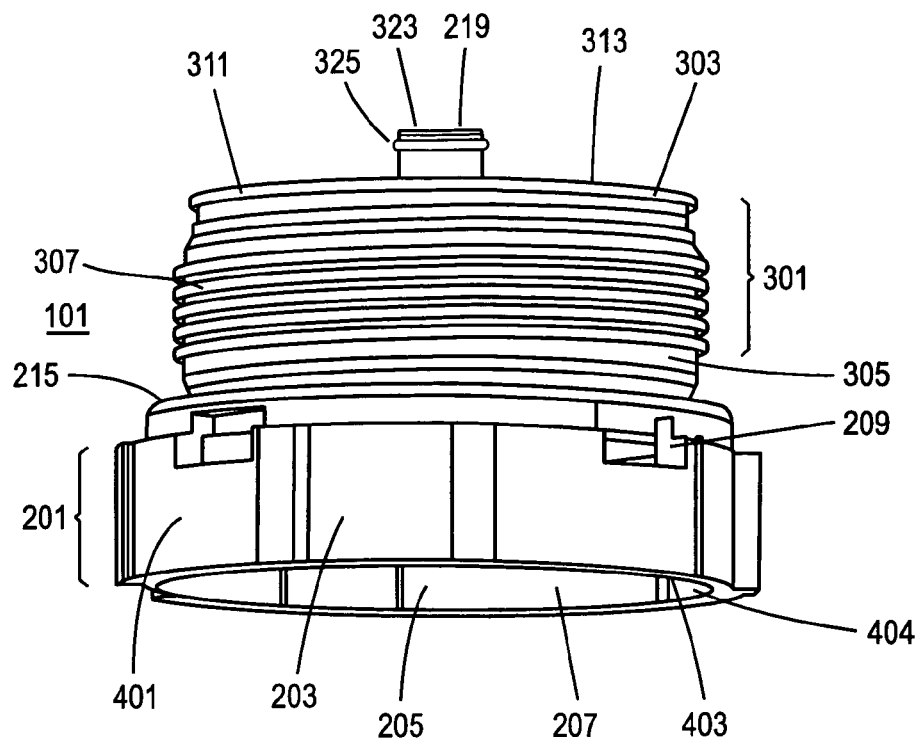
FIG. 4 is a side perspective view of another embodiment of a flow connector as described herein.
Figure 5:
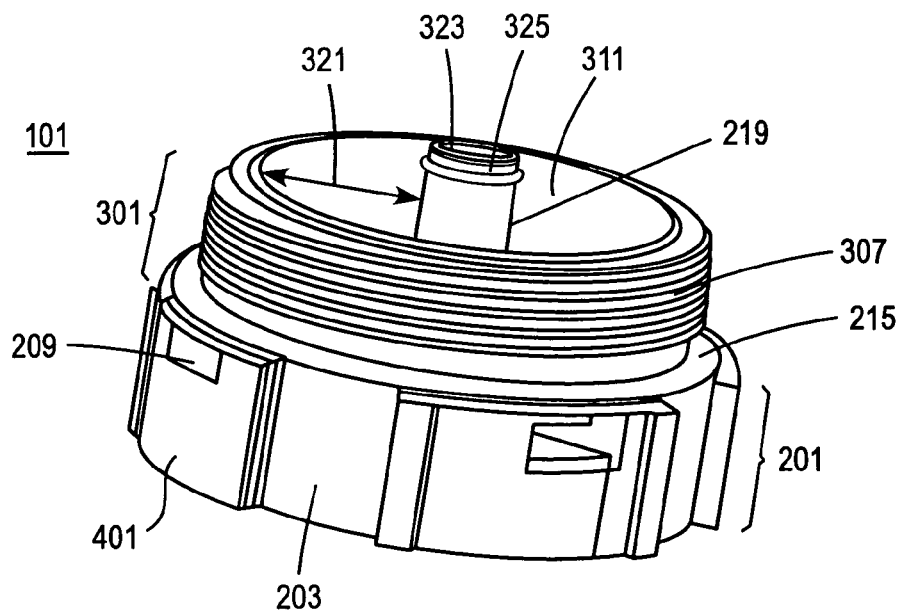
FIG. 5 is another side perspective view of the embodiment of a flow connector illustrated in FIG. 4.

FIG. 4 and FIG. 5 are a side perspective views of another embodiment of flow connector 101. In this embodiment, the plurality of circumferentially spaced openings 209 extend through generally cylindrical first sidewall 203, and are located proximal to protrusions 401 on outer surface 403 of generally cylindrical first sidewall 203, and proximal to recesses 404 on inner surface 207 of generally cylindrical first sidewall 203. Recesses 404 provide a keyway that guides the lugs of a lug-type filtration sump 105 during insertion and removal of the lug-type filtration sump 105 from the flow connector 101. Protrusions 401 provide for maintenance of the thickness of generally cylindrical first sidewall 203 in the regions of said recesses, and also provide surface structure making it easier for technicians to grip this portion of the flow connector during installation of the flow connector 101 into screw-type filtration head 103, and during installation and removal of lug-type filtration sump 105.

Figure 6:
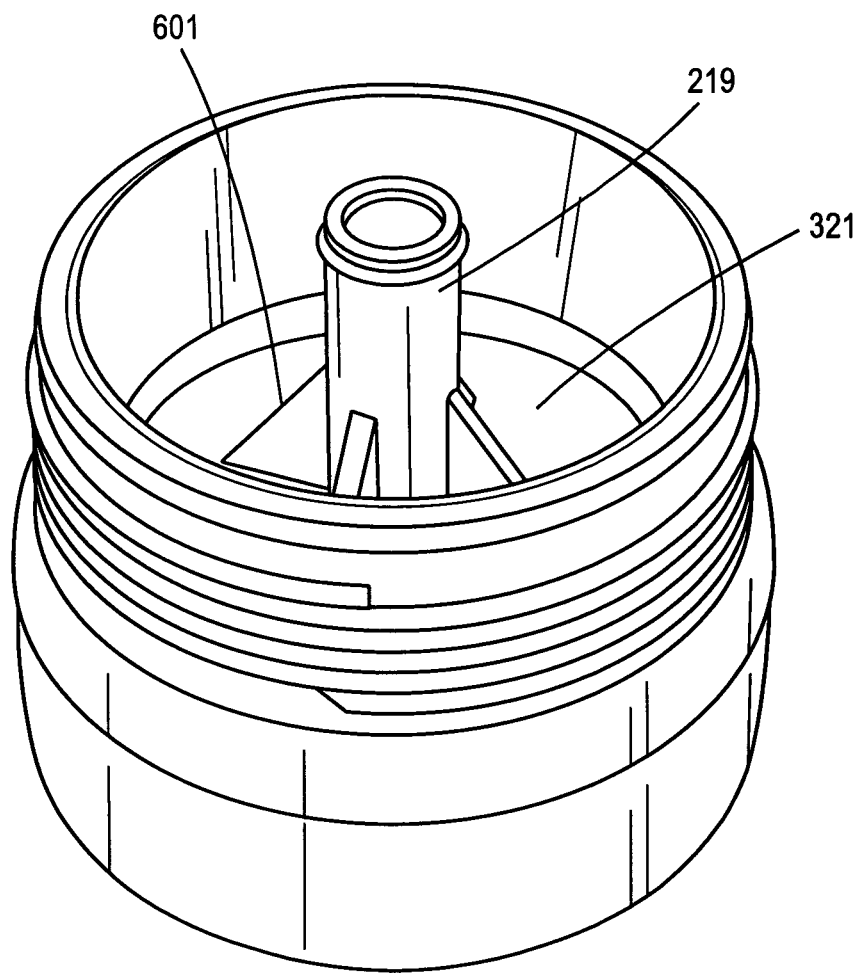
FIG. 6 is a side perspective view of another embodiment of the flow connector described herein.

FIG. 6 is a top perspective view of another embodiment of flow connector 101. The structure is similar to that of the flow connector illustrated in FIG. 2 and FIG. 3, but contains a plurality of vanes 601 disposed in second annular space 321 adjacent to fluid flow conduit 219, which help to direct fluid flow coming from a fluid inlet in screw-type filtration head 103 toward openings 221 in divider plate 215, so that incoming fluid is directed to first annular space 223, and from there to the unfiltered side of the filtration media in filtration sump 105.

The flow connector described herein can be made of any suitable material, however, it has been found to be particularly economical to make the flow connector from polymeric materials, such as from high density polyolefins, such as polyethylene, ABS, polyesters, such as PET, polyamides, such as nylons, and the like. The flow connector can be made by injection molding or other suitable method for forming complex shapes from polymeric materials. The flow connector can be molded as a single piece, or can be molded as separate pieces that are later assembled by, e.g, spin bonding, ultrasonic welding, or joining via an o-ring. For example, it is possible to mold generally cylindrical first sidewall 203 separate from the remainder of the flow connector, and attach it via ultrasonic welding or some other joining technique, for ease and economy of molding.

In use, the flow connector is typically screwed into a screw-type filtration head from which a screw-type filtration sump has been removed. A lug-type filtration sump is then inserted such that the lugs thereof cooperate with the circumferentially spaced openings of the first portion of the flow connector, and engaged thereby. The filtration system can then be pressurized and used as it normally would be, but with decreased adverse results from pressure variations, water-hammer, and the like.

The flow connector described herein can be used with lug-type sumps that contain, as filtration media, conventional annular cylindrical carbon containing filter block, as well as filtration blocks such as those disclosed in U.S. Pat. No. 7,264,726, incorporated herein by reference. In addition, the flow connector described herein can be used in connection with lug-type sumps that contain other purification devices, such as reverse osmosis membranes, hollow fiber membranes, and the like. The sump may vary significantly in length, but in a particular embodiment is sufficiently long to accommodate a filter block of about 9 to about 30 inches in length, more particularly about 10 to 24 inches in length, such as 14 or 20 inches in length.

In the foregoing specification, various features and elements of the flow connector have been described with reference to specific embodiments, but those skilled in the art will recognize that the appended claims are not limited to these specific embodiments, and that other embodiments are included in the claims that do not deviate from the spirit and scope thereof.

What is claimed is:

1. A flow connector adapted to connect a lug-type filtration sump to a screw-type filtration head, comprising:
    a first portion for receiving a lug-type filtration sump, comprising:
        a generally cylindrical first sidewall defining a first opening of sufficient size to receive an end of a lug-type filtration sump;
        an inner surface of said first sidewall having a plurality of circumferentially spaced openings, each of sufficient size and shape to receive and retain a lug of a lug-type filtration sump;
        a first substantially planar portion opposing said first opening, defined by a first surface of a divider plate;
    a second portion receivable by a screw-type filtration head, comprising:
        a generally cylindrical second sidewall defining a second opening of sufficient diameter to be received by a screw-type filtration head;
        an outer surface of said second sidewall comprising a threaded portion;
        an inner portion of said second sidewall;
        a rim of said second sidewall, comprising a first circumferentially extending groove of a depth and width sufficient to receive a first elastomeric o-ring;
        a second substantially planar portion opposing said second opening, defined by a second surface of said divider plate;
    a fluid flow conduit extending axially through said divider plate, defining, with the inner surface of the generally cylindrical first sidewall, a first annular space, and defining with the inner surface of the generally cylindrical second sidewall, a second annular space, wherein the fluid flow conduit is adapted to provide fluid communication between a central longitudinal opening of said filtration sump and a first flow conduit in said filtration head, and wherein any fluid in said fluid flow conduit is separated from said first annular space and said second annular space;
    one or more openings in said divider plate, providing fluid communication between said first annular space and said second annular space, and adapted to provide fluid communication between a second flow conduit in a screw-type filtration head and a gap between a fluid purification media and a sidewall of said lug-type filtration sump;
    wherein the flow connector is molded as a single piece or welded or spin-bonded to form a single piece.

2. The flow connector of claim 1, wherein said fluid flow conduit comprises a tube substantially coaxial with said first portion, said second portion, or both, and comprises a first end, adapted be in fluid communication with said first flow conduit in said filtration head, and a second end, adapted to be in fluid communication with said central longitudinal opening of said filtration sump.

3. The flow connector of claim 2, wherein said first end comprises at least one circumferential groove of sufficient depth and width to receive a second elastomeric o-ring.

4. The flow connector of claim 1, wherein said first surface of said divider plate comprises a substantially circular recess that is substantially coaxial with said fluid flow conduit.

5. The flow connector of claim 4, wherein at least one of said one or more openings is disposed within said substantially circular recess.

6. The flow connector of claim 2, wherein said second end of the fluid flow conduit comprises a first fluid flow conduit opening having a first diameter, and a second fluid flow conduit opening recessed from said first fluid flow conduit opening, wherein the second fluid flow conduit opening has a second diameter smaller than said first diameter.

7. The flow connector of claim 1, wherein said first annular space and said second annular space are substantially coaxial.

8. The flow connector of claim 7, wherein said first and second annular spaces are substantially coaxial with said fluid flow conduit.

9. A filtration system subassembly comprising:
a screw-type filtration head; and
a flow connector as recited in claim 1, engaged with said screw-type filtration head by cooperation of said threaded portion of said outer surface of said second sidewall of the flow connector with threads on said screw-type filtration head.

10. A filtration system subassembly comprising:
a lug-type filtration sump; and
a flow connector as recited in claim 1, engaged with said lug-type filtration sump by cooperation of said plurality of circumferentially spaced openings in said inner surface of said first sidewall of the flow connector with lugs on said lug-type filtration sump.

11. A filtration system, comprising
a screw-type filtration head;
a lug-type filtration sump; and
a flow connector as recited in claim 1, engaged with said screw-type filtration head by cooperation of said threaded portion of said outer surface of said second sidewall of the flow connector with threads on said screw-type filtration head and engaged with said lug-type filtration sump by cooperation of said plurality of circumferentially spaced openings in said inner surface of said first sidewall of the flow connector with lugs on said lug-type filtration sump.

* * * * *